US005704823A

United States Patent [19]
Wittebrood

[11] Patent Number: 5,704,823
[45] Date of Patent: Jan. 6, 1998

[54] METHOD FOR REMOVING AT LEAST ONE COATING FROM METAL SCRAP PARTS

[75] Inventor: Adrianus Jacobus Wittebrood, Velserbroek, Netherlands

[73] Assignee: Hoogovens Staal BV, Ijmuiden, Netherlands

[21] Appl. No.: 603,216

[22] Filed: Feb. 20, 1996

[30] Foreign Application Priority Data

Feb. 17, 1995 [NL] Netherlands .......................... 9500302

[51] Int. Cl.$^6$ .................................................. C23G 3/00
[52] U.S. Cl. ........................... 451/32; 451/35; 451/326
[58] Field of Search ................................. 451/32, 34, 35, 451/104, 113, 326, 327, 328, 330

[56] References Cited

U.S. PATENT DOCUMENTS

| | | |
|---|---|---|
| 3,750,515 | 8/1973 | Wasinger . |
| 4,235,051 | 11/1980 | Spekman, Jr. . |
| 4,265,408 | 5/1981 | Voelskow .......................... 241/228 |
| 4,662,570 | 5/1987 | Heeren . |
| 4,900,409 | 2/1990 | Vunderink . |
| 5,447,465 | 9/1995 | Samsel et al. ...................... 451/32 |

FOREIGN PATENT DOCUMENTS

| | | |
|---|---|---|
| 0417729 | 3/1991 | European Pat. Off. . |
| 0479326 | 4/1992 | European Pat. Off. . |
| 0609864 | 8/1994 | European Pat. Off. . |
| 2343059 | 9/1977 | France . |
| 2012815 | 8/1979 | United Kingdom . |

OTHER PUBLICATIONS

A. Linek "Trommeln, Schriftenreihe Feinarbeitung" 1953, Deutscher Fachzeitschriften—Und Fachbuch–Verlag GMBH, Stuttgart–bladzijde 12, regel 26; bladzijde 13, regel 26–29; bladzijde 13, regel 38–39; bladzijde 21, regel 16–29.
Metals Handbook, 9th Edition, pp. 129–137, ASM Committee On Mass Finishing, "Mass Finishing".

*Primary Examiner*—Eileen Morgan
*Attorney, Agent, or Firm*—Larson & Taylor

[57] ABSTRACT

Method for removing at least one coating from metal scrap parts covered with a coating. The scrap parts are brought into motion in a vessel containing abrasive elements in such a way that multiple collisions occur within the vessel. In further embodiments a liquid, and a metal powder are added to the scrap parts.

14 Claims, No Drawings

METHOD FOR REMOVING AT LEAST ONE COATING FROM METAL SCRAP PARTS

BACKGROUND OF THE INVENTION

1. Field of the Invention

The invention relates to a method for removing at least one coating from metal scrap parts covered with a coating.

2. Description of the Prior Art

Such scrap parts are occurring in greater quantities as metals provided with a coating are being used more. For example, for many applications steel is provided with a coating of zinc, often with a further coating of, for example an organic material such as a plastics material. After use it is desirable to return such coated material as scrap containing metal to an earlier stage of the production chain. However, problems can occur with the reuse of such scrap. Most coated metals such as galvanized steel cannot be reused, or cannot be reused in the desired quantities in a production process earlier in the chain, for example the steel production process, because the coating material placed on it, for example zinc, has a negative effect on the quality of the new product or interferes with the manufacturing process of the new product. Therefore, for these and similar reasons, it is desirable that such coating materials are removed and separated from the underlying metal material, which can then be readily reused. The coated metal, for example galvanized steel, is usually also provided with a further coating, for example a plastics coating which has to be removed in order to be able to remove the underlying coating at all. This is not simple and is often associated with the use of agents such as organic solvents which are environmentally harmful.

Known methods for removing an organic coating from a scrap metal part include burning, shotblasting, chemical dissolution, immersion in a molten salt bath, and immersion in a fluidized sand-bed. All of these methods suffer from the disadvantage that after removal of the organic layer it is necessary to use a separate, subsequent process to remove any underlying metal coating, for example a Zn coating, before the scrap can be reused.

Two methods are known for simultaneous removal of the organic layer and the underlying metal coating. The first of these involves inductively heating the scrap up to a temperature of 1000° C. to burn off a paint layer and evaporate a zinc layer ("Thermal Treatment for Dezincing of Galvanized Scrap", P. Nijssen, C. Marique, ATS Meeting, Oxygen Steelmaking, SIDMAR, 7 Oct. 1993). The second method uses a partial vacuum distillation process in which the scrap is heated to a temperature of 1500°0 C. ("Zinc Recycling in Galvanized Sheet", P. Perot, J. C. Tiss, J. Y. Dauphin First International Conference on the Recycling of Metals, Düsseldorf, Germany, 13–15 May 1992). Both of these processes suffer from high energy losses and, additionally are only suitable for use in relation to Electric Arc Furnace production processes.

GB2012815 describes a method for de-tinning scrap metal. The scrap is agitated in a rotating drum containing a heated alkaline solution.

SUMMARY OF THE INVENTION

It is an object of the invention to provide a method for effectively removing the above described undesired coatings.

Accordingly, the present invention provides a method of treating scrap metal parts to remove at least partly a coating layer or layers on the parts, including maintaining the parts in motion in a vessel in a tumbling manner so that multiple collisions occur within the vessel, wherein a plurality of abrading stones are present in the vessel, whereby said coating layer or layers are at least partly removed.

In this way, the scrap parts can be brought into motion in such a way that constantly changing variations in speed occur between the scrap parts and the abrading stones. It has been found that treating such scrap in this way removes the coatings present surprisingly effectively, by mechanisms such as abrasion, delamination, etc.

In a preferred embodiment of the method in accordance with the invention the abrading stones are abrasive elements in the form of, for example chips, pebbles or marbles. The abrasive elements are, for example of a material that comprises $Al_2O_3$, SiC or mullite.

In another preferred embodiment of the method in accordance with the invention the abrading stones are of a material that comprises $Fe_3Si$. Such abrasive elements have the advantage that, if they are crushed into smaller particles, they can serve as powder containing iron, the effects of which are described below.

The larger dimension of the abrading stones is preferably in the range 2–100 mm, most preferably in the range 2–20 mm. In particular this effectively removes an uncovered metallic coating, for example a zinc layer.

The effectiveness of the invention can be improved where a liquid, for example water, is also added to the scrap parts. This achieves a faster removal of coatings. Water is inexpensive and suffices well. More preferably, the liquid is an alkaline solution, for example an NaOH solution. This achieves a further acceleration in coating removal, particularly in the case of coatings containing zinc.

Particularly good results can be achieved if the alkaline solution contains at least 75 g/l NaOH, more preferably over 300 g/l NaOH. This has the advantage that a far faster removal of the coating is achieved, particularly if the scrap parts comprise coatings containing zinc.

The temperature of the liquid is preferably between 60° and 100° C.

Preferably the largest dimension of the scrap parts ois 200 mm and the smallest dimension 5 mm. If required or desired the size of the scrap parts can be reduced mechanically prior to the step of coating removal, for example by using a method comprising chopping, cutting or trimming.

In a very interesting embodiment of the present invention a powder containing metal is also added to the scrap parts, particularly a powder that comprises metal selected from Pt, Pd, Ir, Co, Ni, Fe. The spectacularly accelerated coating removal which may be achieved by this is ascribed to the increased development of hydrogen which can occur with the intensive contact in a base environment of the scrap parts with one of the metals named. One simple and effective powder is iron powder.

This addition of a metal powder has been found to accelerate coating removal even in the absence of the abrading stones of the present invention. Accordingly, the present invention also provides a method of treating scrap metal parts to remove at least partly a coating layer or layers on the parts, including maintaining the parts in motion in a vessel in a tumbling manner so that multiple collisions occur between the parts, wherein the metal parts are steel parts with a coating layer made of zinc and a metal powder is present in said vessel.

Bringing the scrap parts into motion is preferably achieved simply and effectively by revolving them in a rotating vessel.

However in accordance with the invention it is also possible to do this by exposing the scrap parts to an alternating magnetic field.

DESCRIPTION OF THE PREFERRED EMBODIMENTS

The invention will now be illustrated by reference to non-limiting examples.

EXAMPLE 1

The following trial was carried out on the scale of laboratory testing. A 2 liter polyethylene vessel was filled with:

1. 12 steel pieces 20×50 mm, galvanized on both sides, coating thickness on each side 12.2 µm;
2. 12 steel pieces 25×50 mm, galvanized and painted on both sides, coating thickness on side 1 (paint+zinc)= 40.6 µm, coating thickness on side 2 (paint+zinc)=24.3 µm;
3. about 750 grams aluminium oxide, largest dimension 2–5 mm (abrasive elements);
4. about 750 grams of water.

The vessel once filled was rotated on a roller bed for 12 hours. After 12 hours the following coating thicknesses were measured.

| Material | Coating thickness before (µm) | Coating thickness after (µm) | Reduction in coating thickness (%) |
|---|---|---|---|
| Galvanized | 12.2 | 5.0 | 60 |
| Painted + galvanized, side 1 | 40.6 | 22.3 | 45 |
| Painted + galvanized, side 2 | 24.3 | 17.7 | 27 |

EXAMPLE 2

An 8 liter polyethylene vessel was filled with:

1. 2.5 kg abrasive elements of $Al_2O_3$ with a largest dimension of 20–50 mm;
2. 1.0 kg abrasive elements of $Al_2O_3$ with a largest dimensions of 2–15 mm;
3. 2.0 liters 100 g/l NaOH;
4. 12.4 grams ZnO;
5. 60 steel pieces 20×50 mm, galvanized on both sides, zinc layer 25 µm, provided on both sides with an epoxy coating, epoxy layer 6 µm, provided on one side with a polyvinylidene fluoride (PVDF) coating, layer 20 µm;
6. 200 grams of iron powder, average size 7.5 µm, and brought up to a temperature of 80° C. Then the vessel was rotated on a roller bed. Every 15 minutes three sheets were taken out of the vessel for assessment which gave the following results:

| Time in minutes | Observations |
|---|---|
| 15 | Damaged epoxy and PVDF layer, much zinc to be seen |
| 30 | Epoxy layer disappeared, further damage to PVDF layer |
| 45 | PVDF layer disappeared, both sides much zinc |
| 60 | Zinc surface reduced by 10% |
| 75 | Zinc surface reduced by 30% |
| 90 | Zinc surface reduced by 90% |
| 105 | Clean steel surface, no more zinc present |
| 120 | Clean steel surface, no more zinc present |

EXAMPLE 3

In this example a stainless steel vessel was used. This had the advantage that the vessel was less susceptible to leaking than the polyethylene vessels, especially at temperatures above 80° C. Additionally, the stainless steel has a rougher surface than the polyethylene; this enhances the tumbling action as well as improving the friction between the vessel and the roller bed.

A stainless steel (RVS 304) vessel, having a thickness of 2 mm, a diameter of 0.3 m and a longitudinal dimension of 0.3 m was filled in six different experiments with the materials indicated below:

| Exp. nr. | Conc. NaOH g/l | $Al_2O_3$ 2–13 mm kg | Extra Scrap kg | Conc. Fe powder g/l | Volume of liquid in vessel 1 | Studied Coating Material(s) | Other Comments |
|---|---|---|---|---|---|---|---|
| 1 | 100, 400 | — | — | 50–800 | 0, 8 | zinc | Temp 60–80° C. |
| 2 | 100 | 2, 5 | 3, 8* | 200 | 3 | plastisol | influence of vessel filling |
| 3 | 100 | 2, 8 | 4, 4 | 200 | 4 | PVDF, polyester, GA, ZnNi | |
| 4 | 100 | 2, 8 | 4, 4* | 200 | 4 | automotive | influence of abrasive elements |
| 5 | 100–400 | 2, 8 | 4, 4 | 200 | 4 | plastisol | influence of NaOH concentration |
| 6 | 100 | 2, 8 | 4, 4 | 200 | 4 | automotive | influence of metal coating |

*Depending on experiment

Unless otherwise stated, the following conditions apply:

The zinc concentration of the solution was 5 g/l

Painted scrap parts all had an underlying metal coating layer (e.g. a Zn layer)

The scrap parts are steel and measure 20×50 mm, 100 pieces of scrap are used.

The temperature of the vessel and its contents is 80° C.

Plastisol, PVDF and polyester coatings are applied on 2-sided zinc coated steel ($d_{zinc}$=20 μm), a back coating 7 μm and a primer layer 6 μm.

The vessel was rotated on a roller bed at 0.75 r.p.s. and 3–5 samples of the scrap were removed from the vessel and evaluated at regular time intervals.

The results for these experiments are given below.

Experiment 1

Galvanic coupling of the zinc layer with Fe or steel increases the $H_2$ evolution rate, and therefore the Zn dissolution rate increases. Scrap-scrap galvanic coupling is difficult to realise. However, it as been found that by adding Fe-powder to the vessel this is effectively achieved.

The influence of the added iron powder on the dezincing time can be seen from tables 1, 2 and 3 below:

TABLE 1

| | 100 g/l NaOH, 80° C. | | | |
|---|---|---|---|---|
| | 0 g/l Fe | 50 g/l Fe | 100 g/l Fe | 200 g/l Fe |
| Dezincing time [min] | >30 | 25 | 15 | 5 |

TABLE 2

| | 100 g/l NaOH, 60° C. | | | |
|---|---|---|---|---|
| | 200 g/l Fe | 400 g/l Fe | 600 g/l Fe | 800 g/l Fe |
| Dezincing time [min] | 6 | 4 | 3 | 2 |

TABLE 3

| | 100 g/l NaOH 80° C., 200 g/l Fe | 400 g/l NaOH 80° C., 200 g/l Fe | 100 g/l NaOH 80° C., 800 g/l Fe |
|---|---|---|---|
| Dezincing time [sec] | 240 | 120 | 180 |

It can be seen that the addition of Fe powder is a very effective measure for increasing the rate of de-zincing.

Experiment 2

Plastisol coatings comprising PVC have proved difficult to remove. It has been found however, that by adding additional pieces of stainless steel scrap to the vessel, the removal rate of the plastisol layer can be increased. This may be due to the increased degree of filling of the vessel and is illustrated by the results given in table 4 below.

TABLE 4

| | Plastisol | |
|---|---|---|
| Relative state of deterioration | A | B |
| 0 min. | 1 | 1 |
| 15 min. | 2 | 6 |
| 30 min. | 3 | 11 |
| 45 min. | 4 | 16 |
| 60 min. | 5 | 21 |
| 75 min. | 6 | 26 |
| 90 min. | 7 | 31 |
| 105 min. | 8 | NA |
| 120 min. | 9 | NA |
| 135 min. | 10 | NA |
| 150 min. | 11 | NA |

A-100 pieces of scrap having a 200 μm plastisol layer

B-as A, plus an additional 3.8 kg of stainless steel (RVS) scrap pieces, 2 mm thickness.

Experiment 3

Table 5 below illustrates the variation in removal rate with different organic and metallic coatings.

TABLE 5

| | % removal of organic and metallic coating | | | |
|---|---|---|---|---|
| | PVDF | polyester | galvanneal | Zn/Ni coating |
| 0 min. | 0 | 0 | 0 | 0 |
| 10 min. | 5 | 40 | 100 | 100 |
| 20 min. | 10 | 90 | NA | NA |
| 30 min. | 20 | 95 | NA | NA |
| 40 min. | 50 | 100 | NA | NA |
| 50 min. | 80 | NA | NA | NA |
| 60 min. | 100 | NA | NA | NA |
| 70 min. | NA | NA | NA | NA |

PVDF-200 pieces of scrap having a 25 μm PVDF coating layer

Polyester-200 pieces of scrap having a 25 μm polyester coating layer

Galvanneal-200 pieces of 2-sided galvannealed steel, d=7.5 μm, 8.8% Fe

Zn/Ni coating-140 pieces of 2-sided Zn/Ni coated steel, d=7.5 μm, 87.9% Zn, 11.9% Ni It is interesting to note that all of the coatings were removed in less than 60 minutes. With the Zn/Ni coating it is thought that the nickel helps by virtue of galvanic coupling with the zinc.

Experiment 4

The scrap studied in this experiment had an 'automotive' coating consisting of a 3-layer paint system: an electro-coating layer (d=15 μm), a filter layer (d=20 μm) and a topcoat layer (d=15 μm). The results given below (Table 6), give a comparison between the use of $Al_2O_3$ abrasive elements in combination with additional steel scrap (4.4 kg [A] and the use of grinding stones (65 stones with base dimension 35 mm, height 30 mm and weight 55 g) [B]. In both cases 200 pieces of scrap having the automotive coating were used.

TABLE 6

| | % removal Automotive coating | |
| --- | --- | --- |
| | A | B |
| 0 min. | 0 | 0 |
| 10 min. | 0 | NA |
| 20 min. | 5 | 0 |
| 30 min. | 5 | NA |
| 40 min. | 10 | 10 |
| 50 min. | 15 | NA |
| 60 min. | 20 | 15 |
| 70 min. | 25 | NA |
| 80 min. | 30 | 20 |
| 100 min. | 35 | 25 |
| 120 min. | 50 | 30 |
| 140 min. | 60 | 35 |
| 160 min. | 70 | NA |
| 180 min. | 80 | NA |
| 200 min. | 90 | NA |
| 220 min. | 95 | NA |
| 240 min. | 100 | NA |

Experiment 5

The results given in Table 7 below illustrate the influence of NaOH concentration on the removal rate of a plastisol layer.

TABLE 7

| | Plastisol | |
| --- | --- | --- |
| Relative state of deterioration | 100 g/l NaOH | 400 g/l NaOH |
| 0 hours | 1 | 1 |
| 0,5 hours | 2 | 6 |
| 1,0 hours | 3 | 15 |
| 1,5 hours | 4 | 16 |
| 2,0 hours | 5 | 16 |
| 2,5 hours | 6 | NA |
| 3,0 hours | 7 | NA |
| 3,5 hours | 8 | NA |
| 4,0 hours | 9 | NA |
| 4,5 hours | 10 | NA |
| 5,0 hours | 11 | NA |
| 5,5 hours | 12 | NA |
| 6,0 hours | 13 | NA |
| 6,5 hours | 14 | NA |
| 7,0 hours | 15 | NA |
| 24,0 hours | 16 | NA |

In both cases 200 pieces of scrap having a 200 μm plastisol coating layer were used.

Clearly, an increase in NaOH concentration increases the rate of removal of the plastisol layer.

Experiment 6

The results given in Table 8 below illustrate the influence of the type of underlying metal coating on the removal of an 'automotive' coating applied over the metal coating. The 'automotive' coating is a conventional 3-layer paint system.

TABLE 8

| | Automotive coating | | |
| --- | --- | --- | --- |
| State of deterioration | GA | HDG | EG |
| 0 min. | 1 | 1 | 1 |
| 20 min. | 2 | 2 | 2 |
| 40 min. | 3 | 3 | 3 |
| 60 min. | 4 | 4 | 4 |
| 80 min. | 5 | 5 | 5 |
| 100 min. | 6 | 6 | 6 |
| 120 min. | 7 | 7 | 7 |
| 140 min. | 8 | 9 | 8 |
| 160 min. | 9 | 9 | 9 |
| 180 min. | 10 | 10 | 10 |
| 200 min. | 11 | 11 | 11 |
| 220 min. | 12 | 13 | 12 |
| 240 min. | 13 | 13 | 13 |

GA-70 pieces of scrap, 22.5×50 mm, Galvannealed
HDG-70 pieces of scrap, 20×50 mm, Hot Dip Galvanized
EG-70 pieces of scrap, 17.5×50 mm, Elektro Galvanized It can be seen that there is no appreciable difference between the results for the three different or types of underlying metal coating.

The trials show that paint and also zinc layers could be removed surprisingly well in accordance with the invention. By processing in a solution of lye the paint layer was attacked more quickly by on the one hand the mechanical action resulting from the tumbling motion, and on the other hand delamination of the paint layer as a consequence of the presence of lye.

When galvanized material without any other coatings was processed in lye, the coating removal was enhanced due to the action of the abrasive elements such that the dissolving of the zinc was faster.

After the processing, the clean scrap parts, for example steel scrap, and the abrasive elements of, for example aluminium oxide can be separated using sieves. Any powder containing metal can be separated from the lye solution in various ways, for example by hydrocycloning, sedimentation and where applicable magnetic separation. Process losses aside, the abrasive elements and the powder containing metal may be reused. The coating materials removed can be further separated in a known manner, for example paint residues by filtration and zinc by electrolysis. The method and the different related treatment processes may be operated either in batches or continuously. The invented method can be applied in particular for the removal of so-called alloy coatings such as Zn-Ni, Zn-Al and also Zn-Fe coatings as occur in scrap parts of for example galvanized annealed (galvannealed) steel.

What is claimed is:

1. A method of removing a coating layer selected from the group consisting of zinc, a plastic material and a metal alloy from coated scrap metal parts having a composition different from the composition of the coating layer comprising the steps of introducing a mixture comprising said coated parts, an aqueous alkaline solution and a sufficient amount of a metal powder selected from the group consisting of Pt, Pd, Ir, Co, Ni and Fe to increase the evolution of hydrogen and thereby accelerate coating removal, into a vessel and tumbling said parts, said aqueous alkaline solution and said metal powder in said vessel whereby said coating layer is at least partly removed.

2. A method according to claim 1, where said scrap metal is steel scrap.

3. A method according to claim 1, wherein said abrading stones are made of at least one of $Al_2O_3$, SiC, mullite and $Fe_3Si$.

4. A method according to claim 1, wherein said abrading stones have a maximum dimension of 100 mm.

5. A method according to claim 4, wherein said abrading stones have a maximum dimension of 20 mm.

6. A method according to claim 1, wherein said alkaline solution contains at least 75 g/l NaOH.

7. A method according to claim 1, wherein said scrap metal parts are steel parts with a coating layer made of zinc, and a metal powder is introduced to said vessel along with said abrading stones so as to be additionally present in said vessel during said tumbling step.

8. A method according to claim 1, wherein said metal powder is Fe.

9. A method according to claim 7, wherein said metal powder has a particle size of less than 500 µm, preferably less than 50 µm.

10. A method according to claim 1, wherein said scrap metal parts have a maximum dimension of 200 mm.

11. A method according to claim 1, including the step of reducing the size of the scrap metal parts mechanically, prior to the step of introducing said parts into said vessel.

12. A method according to claim 1, wherein said vessel is a drum, said drum having an axis of rotation, and the method including rotating said drum about said axis of rotation to cause said tumbling, said axis being at an angle of at most 45° relative to a horizontal position.

13. A method according to claim 12, wherein said drum has inward projections on its inner surface which lift the scrap metal parts during rotation.

14. A method in accordance with claim 1 wherein said mixture which is introduced to said vessel further comprises abrading stones and said abrading stones are tumbled in said vessel with said parts, said aqueous solution and said metal powder.

* * * * *